United States Patent Office 3,672,817
Patented June 27, 1972

3,672,817
ALKYLENE CHLOROHYDRIN, OXIDE OR CARBONATE MODIFIED SULFONATED LIGNINS IN A DISPERSE OR VAT DYE CAKE
Sten I. Falkehag, Mount Pleasant, and Howard H. Moorer, Gerald Prazak, and Carl W. Bailey III, Charleston, S.C., assignors to Westvaco Corporation, New York, N.Y.
No Drawing. Filed Dec. 14, 1970, Ser. No. 98,164
Int. Cl. C09b 67/00
U.S. Cl. 8—79                                          7 Claims

ABSTRACT OF THE DISCLOSURE

Dyestuff compositions comprising an admixture of a dye cake, i.e., disperse dyes and vat dyes, and up to 75% by weight of an improved sulfonated lignin surfactant. The improved sulfonated lignin surfactant is the hydroxyalkylated adduct made by reacting with lignin up to 20 moles, preferably from 1 to 10 moles (per 1000 grams of lignin), of a reactant such as an alkylene oxide, a halogen-containing alkyl alcohol or an alkylene carbonate. The preferred reactants include ethylene oxide and 2-chloroethanol. These improved sulfonated lignin adducts are lighter in color, and lessen or eliminate fiber staining, diazo dye reduction and foaming problems.

BACKGROUND OF THE INVENTION

This invention relates to improved sulfonated lignin surfacants and their use as dispersants in dyestuffs. More particularly, this invention relates to hydroxyalkylated sulfonated lignin surfactants which may be made by reacting a lignin with an alkylene oxide, a halogen-containing alkyl alcohol or an alkylene carbonate.

Dyestuff compositions comprise, for the most part, a dye cake, i.e., disperse dyes and vat dyes, and a dispersant. These dyestuff compositions are widely used to color both natural and synthetic fibers. The dye dispersants that may be used to disperse the dye cake vary widely in method of manufacture and source. In the dyestuff composition the dispersant serves three basic functions. It assists in reducing the dye particle to a fine size, it maintains a dispersing medium and it is used as an inexpensive diluent. Generally, however, dye dispersants have been of two major types, sulfonated lignins from the wood pulping industry via the sulfite or kraft processes and naphthalene sulfonates from the petroleum industry. Specialty product such as licorice extracts and various synthetic organic compounds are also used in minor segments of the dispersing market. Each of these surfactants has found application in one or more areas of dye dispersion; however, each dispersing agent possesses one or more undesirable properties.

The disadvantages of sulfonated lignins, whether they are sulfite lignins or sulfonated kraft lignins, include fiber staining, reduction of diazotype dyes, dark brown color and a tendency to stabilize foams. These adverse properties are bothersome to the dyers.

Fiber staining by the lignin occurs mainly on cellulosic and nitrogenous fibers such as cotton, nylon and wool; polyester fibers are also stained but to a lesser extent. The brown stain tends to impart a dull appearance to the dyed fiber which is undesirable. Moreover, the brown lignin stain tends to fade upon exposure to sunlight.

The disperse dyes are typically of the anthraquinone, diazo or diphenylamine classes of dyes. A second disadvantage of sulfonated lignin dispersants has been that when dyeing with diazo-type dyes under high temperature and pressure dyeing processes, the oxidizable lignin structures tend to reduce the diazo dye linkage.

Another disadvantage, the brown color, is psychological. A dyer that purchases a canary yellow dyestuff objects to the brown shading of the brightly yellow dye, even though the actual dyeing is precisely the shade it should be.

Lastly, foam stabilization properties are troublesome for several reasons. First, in ball milling or grinding in general, foam creates cleaning problems by frothing out of dispersion tanks and by building up foam within ball mills which generally slows the grinding process. Spray drying a liquor with considerable foam causes a fluctuation of the temperature within the dryer. As many dyes are acutely sensitive to heat, this can cause deterioration of these particular dyestuffs. In dye application, foaming in a dye bath results in actual loss of color which floats out of the dye bath with the foam. In printing or thermosol application, air bubbles produce light, undyed spots on piece goods. Particularly troublesome in this regard is the introduction of new dye processing equipment such as the jet dyer where much turbulence occurs. The advantages that sulfonated lignin dispersants possess over other dispersant include the ability to impart better heat stability to the dye dispersion, and to disperse with equal effectiveness. Another advantage of a sulfonated lignin dispersant is that it tends to act as a dye retarder. Some dyes have a tendency to start dyeing at very low temperatures. Dyers prefer colors to dye a fiber at a steady rate proportional to temperature incease. If the color dyes too rapidly, the goods take on a streaky appearance; and creases in the material dye more rapidly than the face of the cloth. For this reason, napthalene sulfonates rarely are used alone since they seem to have no retardant properties.

With the advantages and disadvantages of sulfonated lignin dispersants in mind, it is therefore the general object of this invention to provide a dyestuff composition containing a hydroxyalkylated sulfonated lignin adduct as a dispersing agent that is capable of reducing dye particles to a fine size, satisfactorily dispersing the dye and overcoming, to a large degree, the undesirable properties of commercially available dispersants. Another object of this invention is to provide a dyestuff composition whose dispersion is stable under heat and pressure. A further object of this invention is to provide a dyestuff composition containing a sulfonated lignin dispersant which is relatively non-staining. Still a further object of this invention is to provide a dispersant which does not stabilize foam. An even further object of this invention is to provide a sulfonated lignin dye dispersant which will not reduce diazo dyes under high temperatures and pressures. Still another object of this invention is to provide a sulfonated lignin dispersant which has a substantial amount of color removed. Further objects, features and advantages of this invention will be evident from the following disclosure.

SUMMARY OF THE INVENTION

It has been found that the above objects may be accomplished when hydroxyalkylated sulfonated lignin adducts are used as improved dispersants in dyestuff compositions. The inclusion of up to 75% by weight of these adducts with water insoluble dyes such as, disperse dyes and vat dyes, produces a dyestuff composition which retains the advantages and properties of commercially available sulfonated lignin dispersants while eliminating or substantially reducing the undesirable characteristics such as fiber staining, diazo dye reduction, foaming and color. The hydroxyalkylated sulfonated lignin adducts may be made by a variety of methods, but whatever the method used, up to 20 moles preferably from 1 to 10 moles of the reactant per 1000 grams of lignin starting material are reacted with hydroxyl groups in lignin. Useful reactants come from the classes of alkylene oxides, halogen-containing alkyl alcohols and alkylene carbonates, each reactant having up to seven carbon atoms. Preferred examples from each class include ethylene oxide, 2-chloroethanol and ethylene carbonate. It was found that these adducts are up to 21% lighter in color than the unmodified lignin starting material. The term "hydroxylakylated sulfonated lignin" is meant to include those lignin adducts formed by the reaction of a sulfonated lignin and an alkylene oxide, a halogen-containing alkyl alcohol or an alkylene carbonate, each reactant having up to seven carbon atoms, whereby the reactant is reacted with a hydroxyl group in lignin.

DETAILED DESCRIPTION OF THE INVENTION

The lignins employed to make the adducts of this invention include sulfonated lignins from any source such as sulfite lignins from acid and neutral processes, kraft lignins from the sulfate pulping process and lignins derived from other alkaline processes such as the soda or modified soda processes. The sulfonated lignin starting material used to form the adduct is in the ionized form at neutral or alkaline conditions. One of the main sources of sulfonated lignin is the residual pulping liquors of the paper and pulp industries where lignocellulosic materials such as wood, straw, corn stalks, bagasse, and the like are processed to separate the cellulose or pulp from the lignin. For example, the black liquor obtained from the kraft, soda and other alkali processes is not recovered as a sulfonated product but may easily be sulfonated by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

The residual liquors or products containing the lignin portion of the lignocellulosic materials from the various processes may be treated by the conventional methods to sulfonate the lignin to the different degrees desired. The lignin may be sulfonated either prior to or subsequent to the forming of the adduct. The sulfonated lignin are used as salts of ammonia or alkali metals, such as magnesium, calcium, sodium and potassium with the sodium salt of a sulfonated kraft lignin being preferred. The sulfonated lignins thus obtained may be used as such in the reaction to form the adduct, or may be converted to the free acid form by addition of an acid or by use of ion exchange resins and then converted to salts or complexes of metals or other cations other than that obtained in the sulfonation process. By the term "sulfonated lignin," it is meant any lignin containing at least an effective amount of sulfonate groups. Any of the sulfonated lignins may contain up to one-half of other materials such as carbohydrates, phenols and other organic and inorganic compounds. The presence of these other materials results in larger consumption of the reactants used to form the adduct; therefore some purification of the sulfonated lignin starting material is often desirable. The nonsulfonated lignin materials may be removed by various known methods.

The degree of sulfonation present in the lignin is not a controlling factor in making the adduct but may be used to tailor the adduct to have desired characteristics. For example, a highly sulfonated lignin may be referred to as one having above 1 mole sulfonation per 1000 grams of lignin. On the other hand, a sulfonated lignin dispersant having less than 1 mole of sulfonation per 1000 grams of lignin is referred to as a low degree sulfonated lignin.

The hydroxylalkylated sulfonated lignin adducts of this inevntion are made by a variety of methods including, but not limited to using reactants from the classes of alkylene oxides, halogen-containing alkyl alcohols and alkylene carbonates, each class encompassing compounds having up to seven carbon atoms. As the adduct is formed, the reactant serves to block the hydroxyl groups of lignin. An adduct having improved properties is obtained by reacting as little as one mole of reactant per 1000 grams of lignin starting material. The adducts made may have up to 20 moles of reactant per 1000 grams of lignin starting material, but preferably between 1 and 10 moles. Above this upper limit, little, if any, improvement is noted in such properties as fiber staining and diazo dye reduction. For most dyeing applications an adduct having from 3 to 6 moles of reactant per 1000 grams of lignin starting material is used. The reaction of the lignin with any of the reactants serves primarily to lower the acid hydroxyl content of the lignin. Depending upon the starting lignin material, whether residual pulping liquors or a refined product, the acid hydroxyl content of the lignin begins to be blocked by amounts of reactant below 1 mole per 1000 grams of lignin and with about 10 moles of reactant per 1000 grams of lignin can be reduced to substantially zero. It has been found that by blocking the hydroxyl groups in lignin it is possible to reduce the dark reddish-brown color by 10% or more.

One of the methods of forming the adduct is to react an alkaline aqueous solution of lignin with a halogen-containing alkyl alcohol having up to seven carbon atoms. Examples of the halogen-containing alkyl alcohols include halogen substituted ethanol, propanol and butanol. Also contemplated in this class are halogen substituted polyalcohols having up to seven carbon atoms such as dihydroxy chloropropane. One of the preferred reactants of this group is 2-chloroethanol and the reaction may be described as follows:

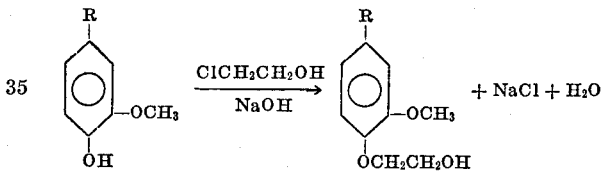

A general procedure for making the adduct according to this method is to dissolve a sulfonated lignin in an alkaline solution and add a given amount (molar ratio based on weight of lignin) of 2-chloroethanol. The solution is heated to at least 40° C. but not above 200° C., preferably to between 90–100° C. The pH of the solution is adjusted to a pH of 7 or above, preferably between 9.0 and 12.5, depending upon specific reactants. The pH is held near the starting pH or slightly above until the reaction is complete. At the end of the reaction the solution is cooled and then dried.

A second method of making the sulfonated lignin adducts is to react the lignin starting material with an alkylene oxide having the general formula:

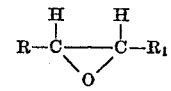

where R and $R_1$ represent a hydrogen or an alkyl or halogen-containing alkyl group and the total reactant having up to seven carbon atoms. Particularly good results may be obtained by using ethylene oxide, propylene oxide, or epichlorohydrin. The adduct is made by simply dissolving the lignin in water and intermixing a given amount of the alkylene oxide at alkaline, neutral or acid pH and reacting between about 0° C. and 200° C. with the time depending upon the temperature used and degree of reaction desired. The adduct solution is allowed to cool and then dried. A catalyst may be used if desired, but is not necessary.

Another method for making the adduct is the reaction of lignin with an alkylene carbonate having up to seven carbon atoms. The preferred reactant of this class is ethylene carbonate, and the reacting conditions are similar to those for the halogen-containing alkyl alcohols.

The dispersants of this invention are particularly useful with disperse dyes or vat dyes in either the dry or liquid form. The hydroxyalkylated sulfonated lignin adduct may be added to the dye cake before, during or after grinding. It is generally preferred to add the surfactant prior to grinding so that it wil be thoroughly mixed and aid in particle size reduction. The amount of hydroxyalkylated sulfonated lignin dispersants added to a dye will vary widely, depending upon the particular dye cake, the material to be dyed and the effect desired. Amounts up to 75% of the sulfonated lignin dispersant, based upon the weight of dried dye cake may be used. The most important factor in determining the proper amount of lignin surfactant to be used in making up the dyestuff is the particular dye cake used. Generally this amount will vary from dye to dye.

The lignin dispersants of this invention have for the most part eliminated the need for other additives in the dyestuff composition, but for special dyeing problems wetting agents, defoamers, carriers or other additives may be included.

The practice of this invention may clearly be seen in the following examples.

EXAMPLE 1

To illustrate the advantage gained by incorporating a hydroxyalkylated sulfonated lignin dispersant into a dyestuff, a series of runs were made in which the properties of various dispersions were compared. In this example, alkali sulfonated lignin was reacted with 2-chloroethanol to make the lignin adduct. The conditions used in the example were, three hundred grams of sulfonated lignin was thoroughly dissolved in 480 ml. of distilled water. A given amount, 1–10 moles/1000 grams lignin material, depending on the run, of 2-chloroethanol was measured out and put into a dropping funnel. The reaction solution was adjusted to pH 10.5 with 50% sodium hydroxide solution and the temperature raised to about 95° C. under a nitrogen atomsphere and constant stirring. When the desired temperature had been reached the 2-chloroethanol was added dropwise, over approximately ½ hour–1½ hours, to the reaction solution while the pH was maintained between 10.5 and 11.5 by the addition of 50% NaOH solution. At the end of the reaction, the solution was allowed to cool and was then spray dried in an Anhydro Spray Dryer.

A standard diazo disperse dye solution was prepared by mixing 5 grams of C. I. Disperse Brown 1 in one liter of distilled water. The hydroxyalkylated sulfonated lignin adducts having varying moles of reactant (from 1 mole to 10 moles) were added to the standard dye solution and the dispersing ability, fiber staining, foaming and diazo dye reduction properties compared to a commercially available sulfonate lignin dispersant (Run #1).

The procedure for determining each property is set out following the examples. The results are shown in the table below.

Sulfonated Lignin; 2-Chloroethanol Adduct

| Run | Moles reactant/ 1,000 grams lignin | Diazo dye [1] reduction | Fiber [2] staining | Foaming test [3], ml. of foam, pH 7 | | |
|---|---|---|---|---|---|---|
| | | | | Initial | 1 min. | 2 min. |
| 1 | None | 5 | 4–5 | 50 | 8 | 4 |
| 2 | 1 | 4 | 4 | 35 | 0(8) | |
| 3 | 3 | 3 | 3 | 50 | 0(58) | |
| 4 | 6 | 2 | 2 | 30 | 0(14) | |
| 5 | 10 | 1 | 1 | 40 | 5 | 4 |

[1] 1=little or no diazo dye reduction, 5=severe diazo dye reduction.
[2] 1=little or no fiber staining, 5=severe fiber staining.
[3] Numbers in parenthesis represent seconds required for foam to break.

The results show that the hydroxyalkylated sulfonated lignin adducts of this invention substantially improve diazo dye reduction, fiber staining and foaming. These sulfonated lignin adducts were also equal or better dispersants at all temperature than the commercially available sulfonated lignin dispersants. Note that as the number of moles of 2-chloroethanol added increases to 10 moles per 1000 grams of lignin starting material the amount of diazo dye reduction decreased proportionally and diazo dye reduction almost disappears when the adducts has 10 moles of reactant.

EXAMPLE 2

A sulfonated lignin was first thoroughly dissolved in water (at a lignin to water ratio between 1:2–1:4), placed in a 2-liter stainless steel bomb and frozen. A given amount of ethylene oxide (1–10 moles/1000 grams of starting lignin material) was weighed out, frozen and added to the frozen lignin solution. The frozen lignin and ethylene oxide solution are used only if there is exposure of the ethylene oxide to the air and if quantative results are desired. By freezing, there is little chance of losing the ethylene oxide while adding it to the bomb and while capping. In a specific run (Run #5) the following procedure was followed, which was typical for each run. A solution of 100 grams of a sulfonated lignin in 200 ml. of distilled water was adjusted to pH 10.0 with 2 N sulfuric acid and frozen in a 2 liter stainless steel bomb. Eight grams (0.2 mole) of ethylene oxide were weighed, frozen and also placed in the stainless steel bomb which was then closed. The bomb was heated to 95° C. while rotating. After approximately 1 hour the excess pressure disappeared, the bomb was opened, and the pH adjusted to 10.0 and the entire solution again frozen. Eight more grams of ethylene oxide were also weighed, frozen and placed in the bomb. The bomb was again heated to 95° C. for approximately 1 hour after which time the pH was again adjusted to 10. The solution was again frozen and 4 more grams (0.1 mole) of ethylene oxide were added. The bomb was again heated to 95° C. for 1 hour at which time the solution was allowed to cool, and the entire mixture was spray dried.

The lignin adducts were admixed with portions of the standard diazo disperse dye solution outlined in Example 1 and the various properties measured and again compared to a commercially available sulfonated lignin dispersant, shown in Run #1. The results are shown in the table below.

Sulfonated lignin ethylene oxide adducts as dyestuff dispersants

| Run | Moles reactant/ 1,000 gms. lignin | Diazo dye [1] reduction | Fiber [2] staining | Foam test [3], ml. of foam | | | | |
|---|---|---|---|---|---|---|---|---|
| | | | | pH 7.0 | | | pH 9.5 | |
| | | | | Init. | 1 min. | 2 min. | Init. | 1 min. |
| 1 | | 4 | 4–5 | 50 | 10 | 6 | 35 | 0(15) |
| 2 | 2 | 3 | 2–3 | 50 | 4 | 0(10) | 20 | 10 |
| 3 | 4 | 1–2 | 2 | 25 | 4 | 0(55) | 15 | 0(45) |
| 4 | 6 | 1–2 | 1 | | | | | |
| 5 | 10 | 2 | | | | | | |

[1] 1=little or no diazo dye reduction, 5=severe diazo dye reduction.
[2] 1=little or no fiber staining, 5=severe fiber staining.
[3] Numbers in parenthesis represent seconds required for the foam to break.

In all cases the fiber staining and diazo dye reducing tendencies improved when compared with the conventional sulfonated lignin dispersant of Run #1. Furthermore, good dispersant properties were retained and foaming decreased significantly.

EXAMPLE 3

To show the versatility of these sulfonated lignin dispersants, various adducts were prepared in a manner described in Examples 1 and 2 and compared to a commercially available sulfonated lignin dispersant (Run #1). The lignin starting material for Run #2 was a lignin from a sulfite pulping process, Marasperse CB. Run #3 was a low degree sulfonated lignin. The adducts were also made by varying the reactants with a high degree sulfonated lignin at 6.0 moles per 1000 grams lignin starting material of the following, ethylene carbonate, 2-bromoethanol, 3-chloropropanol, propylene oxide, epichlorohydrin and dihydroxyl chloropropane. The adducts were admixed with portions of the standard diazo dye solution outlined in Example 1 and tested for diazo dye reduction and fiber staining.

HYDROXYALKYLATED SULFONATED LIGNIN ADDUCTS AND DYESTUFF DISPERSANTS

| Run | Sample or adduct | Moles reactant | Diazo dye[1] reduction | Fiber staining |
|---|---|---|---|---|
| 1 | Commercial sulfonated lignin dispersant. | | 5 | 5 |
| 2 | Lignosulfonate-ethylene oxide | 6 | 3-4 | 2-3 |
| 3 | Low degree sulfonated lignin-ethylene oxide. | 5 | 1-2 | 1 |
| 4 | Sulfonated lignin-2 bromoethanol | 6 | 2 | 2 |
| 5 | Sulfonated lignin-3 chloropropanol | 6 | 2 | 2-3 |
| 6 | Sulfonated lignin-propylene oxide | 6 | 1 | 1 |
| 7 | Sulfonated lignin-epichlorohydrin | 6 | 3 | 2 |
| 8 | Sulfonated lignin-ethylene carbonate. | 6 | 3 | 3 |
| 9 | Sulfonated lignin-dihydroxyl chloropropane. | 6 | 2 | 2 |

[1] 1=little or no diazo dye reduction, 5=severe diazo dye reduction.
[2] 1=little or no fiber staining (nylon), 5=severe fiber staining.

The results show that both fiber staining and diazo dye reduction are improved regardless of whether a lignosulfonate from sulfite pulping liquor or a kraft lignin is the starting lignin material. Further, that the degree of sulfonation of the lignin is not controlling. Also, various reactants from each class were found to give the desired improvements in fiber staining and diazo dye reduction.

EXAMPLE 4

As stated above, one of the reasons for not using sulfonated lignins in dyestuff composition is their dark color. As a result of this invention the color of lignin is significantly lowered in hydroxyalkylated sulfonated lignin adducts. The reduction of color in products from Examples 1 and 2 are shown in the table below and compared with a commercially available sulfonated lignin dispersant. The color of each lignin was determined by measuring the adsorption of a pH 6.0 lignin solution at 500 nanometers (nm.) on an ultraviolet spectrometer. The color value at 500 nm. was calculated from the following equation:

Color value at 500 nm.

$$= \frac{\text{Absorption @ 500 nm.}}{\text{Concentration of lignin (moles/liter)}}$$

RESULTS OF COLOR REDUCTION

| Test No. | Starting lignin material | Chemical additive | Moles of additives (per 1,000 g. starting material) | Color value at 500 nm. | Percent color reduction |
|---|---|---|---|---|---|
| 1 | High degree sulfonated lignin. | None | | 0.52 | |
| 2 | do | do | | 0.50 | |
| 3 | do | 2-chloroethanol | 1 | 0.56 | 0 |
| 4 | do | do | 3 | 0.56 | 0 |
| 5 | do | do | 6 | 0.44 | 15 |
| 6 | do | do | 6 | 0.41 | 21 |
| 7 | do | Ethylene oxide | 7 | 0.48 | 8 |
| 8 | do | do | 4 | 0.47 | 10 |
| 9 | do | do | 10 | 0.45 | 13 |
| 10 | do | do | 5 | 0.46 | 11 |
| 11 | do | do | 5 | 0.38 | 27 |
| 12 | Low degree sulfonated lignin. | None | | 0.61 | |
| 13 | do | ClCH$_2$CH$_2$OH | 6 | 0.43 | 29 |
| 14 | do | ClCH$_2$CH$_2$OH | 6 | 0.34 | 44 |

The results show that the sulfonated lignin adduct from Example 1 lost 21% of its color (test #6). The sulfonated lignin-ethylene oxide adducts from Example 2 showed color reductions in the range of 19-13%. These sulfonated lignin adducts have a tan appearance as opposed to the normal dark brown color of sulfonated lignin.

The test for determining extent of fiber staining caused by lignin based surfactants was to weight out 10 grams of the lignin based surfactant and dissolve in 300 ml. of tap water. Adjust the pH to 9.0 with acetic acid. Add a 5 gram nylon fiber skein and heat to a boil. Boil the mixture for 15 minutes, wash the skein with tap water and dry in an oven at 105° C.

The test for determining foaming properties of disperse dye surfactants was to weight out 1 gram of surfactant and dissolve in 100 ml. of tap water. Adjust to pH 9.5 with acetic acid and pour into a 250 ml. graduated cylinder. Rapidly invert 5 times and measure the height of the foam in ml. immediately after completing the inversions and again after 1 minutes and 2 minutes have elapsed. If the foam dissappears within 25 minutes note the time at which all the foam vanished. Return the solution after all the foam has broken (or 2 min.) and lower the pH to 7.0 with acetic acid and again perform the inversion and recording part of the test.

The diazo dye reduction test was performed by charging a pressure bomb with 500 mg. of C.I. Disperse Brown 1 dye, 200 cc. water, and 20 grams of sulfonated lignin dispersant. The mixture was thoroughly stirred and the pH adjusted to between 5 and 6 with acetic acid. A 10 gram nylon skein was placed in the dye mixture, the bomb sealed and heated to 130° C. for one hour. After cooling, the skein was removed from the bomb, washed and dried. The reduction in color was compared by visual observation, but, may if desired be determined by analysis of the residual solution with a spectrometer.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A dyestuff composition comprising a disperse and vat dye cake and from 1% to 75% by weight of said dye cake, of the adduct of a lignin-based material from the group consisting of sulfite waste liquor lignan and sulfonated alkali lignin and from 1 to 20 moles per 1000 grams of lignin of a reactant of the group consisting of an alkylene oxide, a halogen-containing alkyl alcohol wherein the halogen is on a carbon adjacent to the alcohol group and in close proximity to the hydroxyl group or an alkylene carbonate, each having up to seven carbon atoms.

2. The composition according to claim 1 wherein said sulfonated lignin is based on an alkali lignin.

3. The composition according to claim 1 wherein said sulfonated lignin is based on a sulfite waste liquor lignin-containing product.

4. The composition according to claim 1 wherein said alkylene oxide is a member of the group consisting of ethylene oxide and propylene oxide.

5. The composition according to claim 1 wherein said halogen-containing alkyl alcohol is 2-chloroethanol.

6. The composition according to claim 1 wherein said alkylene carbonate is ethylene carbonate.

7. The composition according to claim 1 wherein said adduct comprises a sulfonated lignin reacted with from 1 to 10 moles of reactant per 1000 grams of lignin starting material.

References Cited

UNITED STATES PATENTS 2,156,160  4/1939  Olson _____ 280—124 A
2,574,597  11/1951  Solvin _____ 8—39

DONALD LEVY, Primary Examiner

U.S. Cl. X.R.

8—34, 99, 83

UNITED STATES PATENT OFFICE
CERTIFICATE OF CORRECTION

Patent No. 3,672,817  Dated June 27, 1972

Inventor(s) Sten I. Falkehag et al

It is certified that error appears in the above-identified patent and that said Letters Patent are hereby corrected as shown below:

Column 1, line 58, "diazotype" should read -- diazo-type --.

Column 3, line 43, "lignin" should read -- lignins --.

Column 6, in the Table heading before "min." (first occurrence) the "1" should appear; before "min." (second occurrence) the "2" should appear; and before "min." (third occurrence) the "1" should appear.

Column 7, line 66, the number "19" should read -- 10 --.

Column 8, line 11, the number "25" should read -- 2 --.

In claim 1, line 4, "lignan" should read -- lignin --.

Signed and sealed this 6th day of March 1973.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,672,817                          Dated June 27, 1972

Inventor(s) Sten I. Falkehag et al.

It is certified that error appears in the above-identified patent and that said Letters Patent are hereby corrected as shown below:

In claim 1, line 1, delete "and" and insert -- or --.

Signed and sealed this 12th day of June 1973.

(SEAL)
Attest:

EDWARD M. FLETCHER, JR.             ROBERT GOTTSCHALK
Attesting Officer                    Commissioner of Patents